US008861856B2

(12) United States Patent
Deryagin et al.

(10) Patent No.: US 8,861,856 B2
(45) Date of Patent: Oct. 14, 2014

(54) MODEL-BASED METHODS OF DOCUMENT LOGICAL STRUCTURE RECOGNITION IN OCR SYSTEMS

(75) Inventors: Dmitry Deryagin, Moscow (RU); Konstantin Anisimovich, Moscow (RU)

(73) Assignee: ABBYY Development LLC, Moscow (RU)

( * ) Notice: Subject to any disclaimer, the term of this patent is extended or adjusted under 35 U.S.C. 154(b) by 50 days.

(21) Appl. No.: 13/597,020

(22) Filed: Aug. 28, 2012

(65) Prior Publication Data

US 2013/0223743 A1 Aug. 29, 2013

Related U.S. Application Data

(63) Continuation-in-part of application No. 12/236,054, filed on Sep. 23, 2008, now Pat. No. 8,260,049.

(60) Provisional application No. 60/976,348, filed on Sep. 28, 2007.

(51) Int. Cl.
*G06K 9/34* (2006.01)
*G06K 9/00* (2006.01)
*G06T 7/00* (2006.01)

(52) U.S. Cl.
CPC .......... *G06T 7/0061* (2013.01); *G06K 9/00469* (2013.01)
USPC ....................................................... 382/180

(58) Field of Classification Search
USPC .................... 382/171, 173, 176, 199, 309
See application file for complete search history.

(56) References Cited

U.S. PATENT DOCUMENTS

| | | | |
|---|---|---|---|
| 5,129,076 A | 7/1992 | Freeman et al. | |
| 5,159,667 A | 10/1992 | Borrey et al. | |
| 5,669,007 A | 9/1997 | Tateishi | |
| 5,784,487 A | 7/1998 | Cooperman | |
| 5,926,823 A | 7/1999 | Okumura et al. | |
| 5,937,084 A | 8/1999 | Crabtree et al. | |
| 6,377,704 B1 | 4/2002 | Cooperman | |
| 6,694,053 B1 | 2/2004 | Burns et al. | |
| 6,885,481 B1 | 4/2005 | Dawe | |
| 6,922,697 B1 | 7/2005 | Suehira | |
| 6,963,871 B1 | 11/2005 | Hermansen et al. | |
| 7,020,664 B1 | 3/2006 | Yamaguchi et al. | |
| 7,197,510 B2 | 3/2007 | Abe et al. | |
| 7,305,613 B2 | 12/2007 | Oezgen | |
| 7,349,651 B2 | 3/2008 | Fernandez | |
| 7,370,059 B2 | 5/2008 | Geraud | |
| 7,392,473 B2 | 6/2008 | Meunier | |
| 7,539,698 B2 | 5/2009 | Sakaniwa et al. | |
| 7,796,293 B2 | 9/2010 | Fujishige et al. | |
| 7,831,098 B2 | 11/2010 | Melikian | |
| 8,035,855 B2 | 10/2011 | Monga et al. | |
| 8,064,099 B2 | 11/2011 | Shirata | |
| 8,671,112 B2 | 3/2014 | Amar et al. | |
| 2004/0264774 A1 | 12/2004 | Anisimovich et al. | |
| 2006/0235855 A1 | 10/2006 | Rousseau et al. | |
| 2006/0282442 A1 | 12/2006 | Lennon et al. | |
| 2006/0290789 A1 | 12/2006 | Ketola | |
| 2007/0239435 A1 | 10/2007 | Stuhec | |
| 2010/0245938 A1 | 9/2010 | Coley et al. | |

FOREIGN PATENT DOCUMENTS

JP 06251185 A 9/1994
JP 2006211261 A 8/2006

*Primary Examiner* — Duy M Dang
(74) *Attorney, Agent, or Firm* — LeighAnn Weiland; Veronica Weinstein

(57) ABSTRACT

The invention relates to methods for determining a logical structure of a document. The system stores a collection of models, each of which describes one or more possible logical structures. At least one document hypothesis is generated for the whole document. For each document hypothesis, the system verifies the document hypothesis on each page, for example, by generating at least one block hypothesis for each block in the document based on the document hypothesis, selecting a best block hypothesis for each block, selecting the model that corresponds to a best document hypothesis the document hypothesis that has a best degree of correspondence with the selected best block hypotheses for the document, and forming a representation of the document based on the best document hypothesis described.

24 Claims, 6 Drawing Sheets

MODEL-BASED METHODS OF DOCUMENT LOGICAL STRUCTURE RECOGNITION IN OCR SYSTEMS

CROSS-REFERENCE TO RELATED APPLICATIONS

For purposes of the USPTO extra-statutory requirements, the present application constitutes a continuation-in-part of U.S. patent application Ser. No. 12/236,054 that was filed on 23 Sep. 2008, which is currently co-pending, or is an application of which a currently co-pending application is entitled to the benefit of the filing date. Patent application Ser. No. 12/236,054 claims the benefit of priority to U.S. 60/976,348 which was filed on 28 Sep. 2007.

The United States Patent Office (USPTO) has published a notice effectively stating that the USPTO's computer programs require that patent applicants reference both a serial number and indicate whether an application is a continuation or continuation-in-part. See Stephen G. Kunin, Benefit of Prior-Filed Application, USPTO Official Gazette 18 Mar. 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND OF THE INVENTION

1. Field

Embodiments of the present invention are directed towards the implementation of methods and systems for Optical Character Recognition (OCR) and Intelligent Character Recognition (ICR) that are capable of processing documents.

2. Description of the Related Art

OCR systems may used to transform images of paper documents into a computer-readable and computer-editable form which is searchable. OCR systems may also be used to extract data from such images. A typical OCR system consists of an imaging device that produces the image of a document and software that runs on a computer that processes the images. As a rule, this software includes an OCR program, which can recognize symbols, letters, characters, digits, and other units and compound them, if they are arranged next to each other, into words, which may then be checked by means of a dictionary. Traditional OCR systems output plain text, which typically has simplified layout and formatting, retaining only paragraphs, fonts, font styles, font sizes, and some other simple properties of the source document.

However, a document may be regarded not only as text, but as an object with a physical and a logical structure.

The physical structure or document layout is in fact what makes text information a document. Physical structure is intended to keep information in an ordered form for proper and better presentation. It manifests itself as the physical arrangement of form elements such as images, tables, columns, etc. An OCR program may detect the position of form elements in a document and reconstruct them but it does not understand the purpose or meaning of the form elements. Further, the OCR program does not understand the relations between the various form elements.

The logical structure of the document maps the form elements into one or more logical blocks based on an understanding of the meaning of the form elements and the relations between them. The logical structure is what controls the logical ordering (e.g., viewing and reading order) of the information in a document. The logical structure includes information about the purpose and/or meaning of all form elements and defines the reading order in which the information contained in the document should be perceived. It is tightly linked with the document's physical structure and depends on the relations among the various formatting elements and their reading priorities.

The logical structure may not be so obvious from a usual, human's point of view. In most cases a "human reader" comprehends the logical structure of documents automatically; it is self-evident to him and inseparable from the document's physical structure. But this human perception is not characteristic of computers and, in particular, of OCR and document conversion programs. The logical structure of a document is beyond the traditional "machine comprehension" and may become a bottleneck in automated document recognition.

SUMMARY

The invention relates to method for determining a logical structure of document, including multi-page documents. The system is provided with a collection of models, each of which describes one or more possible logical structures. The methods include generating at least one document hypothesis for the whole document. For each document hypothesis, the system verifies the document hypothesis by, for example, generating at least one block hypothesis for each block in the document based on the document hypothesis, selecting a best block hypothesis for each block, selecting the model that corresponds to a best document hypothesis the document hypothesis that has a best degree of correspondence with the selected best block hypotheses for the document, and forming the document based on the best document hypothesis described. In case of a multi-page document, the document hypothesis is verified on the each next page, and it may be corrected or discarded and another hypothesis may be selected.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings, wherein:

DETAILED DESCRIPTION

Figure 1:
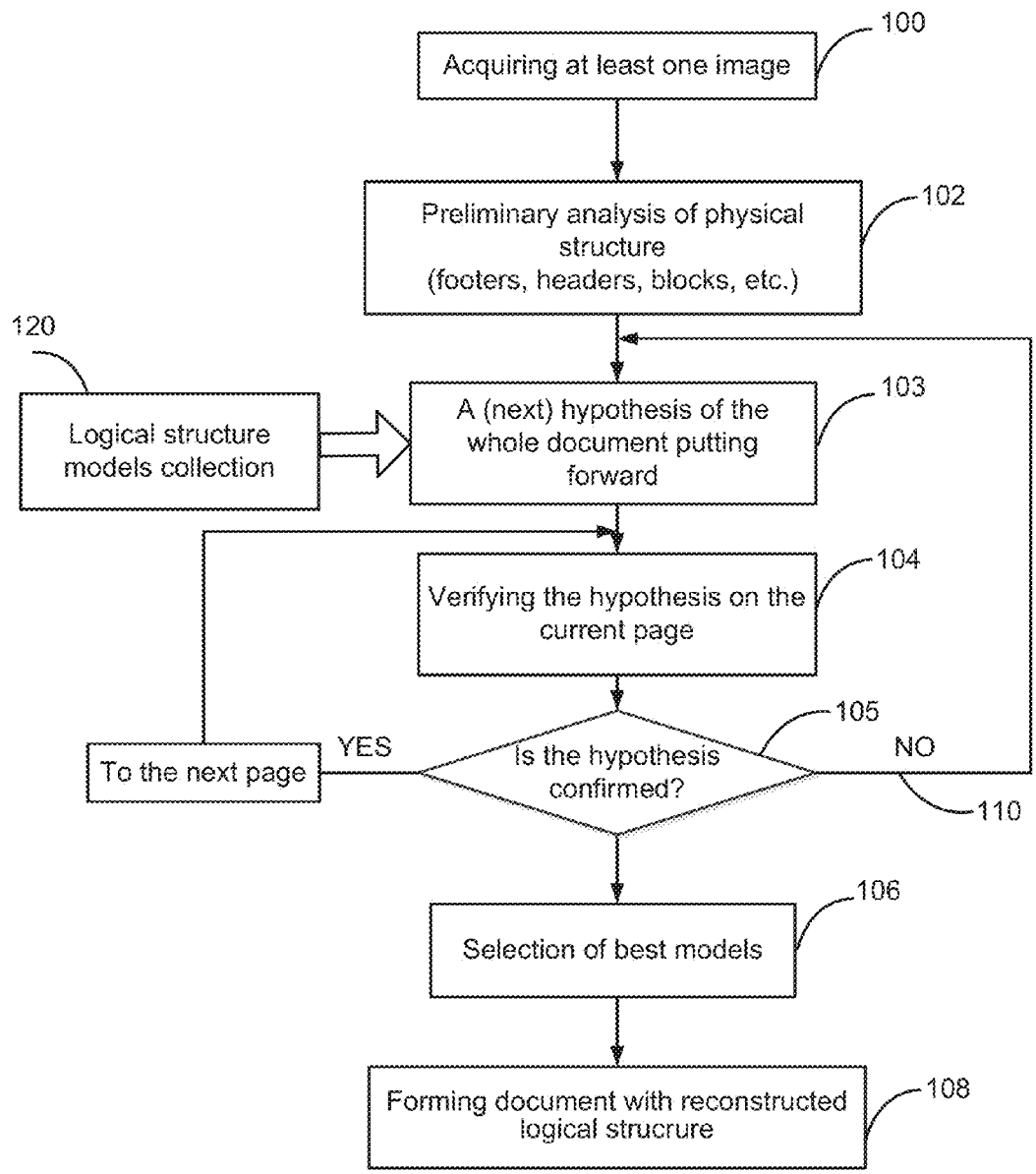
FIG. 1 shows a flowchart for recognizing a model of a document, in accordance with one embodiment of the invention.

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative-embodiments mutually exclusive of other embodiments. Moreover, various features are described which may be exhibited by some embodiments and not by others. Similarly, various requirements are described which may be requirements for some embodiments but not other embodiments.

Embodiments of the invention disclose a method and a system for efficient recognition of the logical structure of a document comprising form elements such as images, tables, pages, headings, chapters, sections, separators, paragraphs, sub-headings, tables of content, footnotes, references, bibliographies, abstracts, figures. The form elements may have particular formatting. For example, a paragraph may be formatted to have multiple columns, or a page form element may be formatted to have a header and/or footer. In addition, the document may be a multi-page document, where each page may have the same or a specific logical structure within the model of the whole document. In accordance with embodiments of the present invention, a result of OCR or ICR is an editable text document that replicates the logical structure, layout, formatting, etc. of the original paper document or document image that was fed to the system.

In general, the methods described herein include such exemplary steps as the following:

acquiring at least one image of pages the document;
identifying one or more blocks in the image of the document;
generating at least one document hypothesis for the whole document,
for each document hypothesis, verifying said document hypothesis on the each page including:
  (a) generating at least one page hypothesis including block hypothesis for each block on the page based on the document hypothesis; and
  (b) selecting a page hypothesis based on best block hypothesis for each block;
correcting or discarding said document hypothesis in case of disconfirming said document hypothesis on the page;
selecting programmatically as a best document hypothesis the document hypothesis that has a best degree of correspondence with one or more block hypotheses for the document on the all pages; and
forming a representation of the document based on the best document hypothesis.

In one embodiment, said generating hypothesis is executed on the base of a plurality of document models, wherein each document model describes one or more possible logical structure, and wherein each document model includes information about blocks of said respective document model. After generating said document hypothesis, the hypothesis is verified on each page of the document. In this process at least one hypothesis for each page (page hypothesis) is generated and also it is verified by means of generating at least one block hypothesis corresponding to at least one of said identified one or more blocks in the image of the document.

In one embodiment, the system comprises an imaging device connected to a computer with specially designed OCR or ICR software. The system is used to scan a paper document (source document) to produce a document image thereof. The document may have several form elements. For example the document may have several font types, fonts of different sizes, several different blocks or areas of text, tables, separators (e.g. horizontal or vertical lines), etc. In one embodiment, the OCR software analyzes the mutual arrangement of the above form elements and compares it with the descriptions of possible logical structures available to it in order to generate a hypothesis about the logical structure of the source document. Then the hypothesis is verified and the recognized text is transformed to reproduce the native formatting of the source document. Finally, the recognized text is exported into an extended editable document format such as a Microsoft Word format, rich text format (RTF), and tagged portable document format (PDF).

In another embodiment, the recognized logical structure is used to arrive at conclusions about the model, type, and style of the document. For example, the system may determine whether it is a business letter, a contract, a legal document, a certificate, an application, magazine, newspaper, etc. The system stores a collection of models, each of which describes one or more possible logical structures. In one embodiment, the system generates (puts forward) a plurality of hypotheses, each corresponding to a model of a document stored or available to the system. Model refers to the "form" or general appearance of a document, a "category," template or pattern that the document in question generally follows. For simplicity and convenience, only "model" is used herein.

Subsequently, the system recognizes the document and checks how well each of the generated hypotheses corresponds to the actual properties of the document. The system evaluates each hypothesis based on a degree of correspondence such as between a model of a document and the actual document. Subsequently, the system selects the model that corresponds to the best hypothesis, i.e. the hypothesis with the highest correlation with the actual properties of the document.

In order to process the document image so that its logical structure is correctly reconstructed, in one embodiment, the system is provisioned with information about the possible mutual arrangement of form elements. As noted above the form elements include elements such as columns (main text), headers and footers, endnotes and footnotes, an abstract (text fragment below the title), headings (together with their hierarchy and numbering), a table of contents, a list of figures, bibliography, the document's title, the numbers and captions of figures and tables, etc.

The correct recognition of the logical structure of a document ensures the correct reading order, the correct association of captions, the correct reproduction of the styles and headers/footers, and the ability to recreate hyperlinks in the document. Advantageously, an OCR system capable of recognizing the logical structure in accordance with the techniques disclosed herein will output not plain text, but a structured object reproducing the native formatting. This object can be exported into structured formats (extended document formats), such as Rich Text Format (RTF), Hyper Text Markup Language (HTML), and tagged Portable Document Format (PDF).

Advantageously, the correct recognition of the logical structure of a document enables the system to preserve the basic layout of the source document and to classify documents according to their types, including spreadsheets, magazine articles, contracts, and even faxes. As a result, the headers and footers, page numbering, footnotes, and fonts and styles of the original are retained. For example, footnotes linked with their corresponding text on the page, image captions, graphics, and tables may be automatically grouped with the appropriate object type. Headers and footers can be directly edited or even removed using the header and footer tools provided by any text editing software. Text flows are maintained across multiple pages. A variety of additional formatting elements, including line numbering, signatures, and stamps found in legal and other documents, may be recognized and retained.

In one embodiment, the system analyzes a document in its entirety rather than page by page. But, if the document hypothesis that had been selected is not confirmed on a page, said document hypothesis may be corrected (for example, supplemented) or discarded and another hypothesis may be put forward. In one embodiment, the building block of the logical structure is a paragraph. A page may consist of sections, headers/footers, text inserts, pictures, and photographs, among others. One image of a document may correspond to two facing pages, and in such case it is processed as two pages. A section of a document may comprise columns and section-level inserts. An article printed in two columns with one general title and an abstract is treated as having two sections. A column may comprise text, figures, and tables supplied with captions. A captioned figure or a captioned table may also be part of an insert. Inserts may also include any text.

FIG. 1 of the drawings shows a flowchart of steps describing the process to recognize the logical structure of a document and select its model, in accordance with one embodiment of the invention. Referring to FIG. 1, at block 100 a document image is acquired, e.g. from an imaging device. At block 102, by means of an OCR software or function, a preliminary analysis of the physical structure of the document is executed, and in particular, at least blocks, e.g. footers, headers, are detected. The blocks may comprise text, pictures, tables, etc. In one embodiment, text occurring in the block may be clustered based on the properties of its font, i.e., a font which is only slightly different from the main font. A different font in the document may be the result of incorrect OCR processing, and may also be considered as if the different font were of a main font or same font as other parts of the document.

Next, at block 103, at least one document hypothesis about possible logical structure of the whole document is generated. The document hypotheses are generated on the basis of a collection of models 120 of possible document logical structures. In one embodiment, the collection of models 120 of possible logical structures may includes models of different documents, for example, a research paper, a patent, a patent application, business letter, a contract, an agreement, etc. Each model may describe a set of essential and possible elements of logical structure and their mutual arrangement within the model. In one embodiment, for example, one of possible models of a research paper may include a title, an authors information, an abstract, an issue name, an issue number, and an issue date within page footer or page header, tables, pictures, diagrams, endnotes and footnotes, bibliography, flowcharts and other.

The collection of models may be structured. In one embodiment, the most probable document hypothesis may be generated first, the next most probable document hypothesis is generated second, and so forth.

Then, at the step 104 the document hypothesis is verified. In case of multi-page document verifying the hypothesis should be executed on the each page. Logical structures of pages may be different, but it is described by corresponding document model which had been selected. Verifying each document hypothesis includes generating at least one hypothesis for each page (page hypothesis) and thereupon generating at least one block hypothesis corresponding to at least one of said identified one or more blocks in the image of the document.

For example, in one embodiment, the system may hypothesize that the one- or two-line blocks at the very bottom (at the very top) of the page are footers (headers). In another embodiment, the system generates a header (footer) hypothesis for standalone text paragraphs of not more than three lines which are separated from the body text by a sufficiently large interval. As an additional constraint, the height of the header/footer lines may not be greater than the height of the lines in the rest of the text. To verify the hypothesis, the system checks if the assumed header/footer indeed recurs on each page, as may be required by a model in the system.

In one embodiment, various models of document headers/footers are available to the system. Various methods may be used to specify the said models. The only requirement is that a method establishes a spatial relation for the elements of the model (i.e. their location relative to the rest of the text). For example, the following header/footer models can be used:

1. Page number. Headers/footers may consist of an Arabic numeral (or, less frequently, a Roman numeral, or a letter and numeral combination, such as A1, A2, A3 . . . ) and, may be, a short word, for example "page," patterned on a known model and changing from page to page.

2. Document attribute. An attribute may be the title, the author, or copyright owner of the document, among other things. A document attribute remains unchanged throughout the entire document.

3. Document part attribute (e.g. a chapter title). Remains unchanged on several consecutive pages, then ceases to recur.

4. Header/footer which changes from page to page but which is not described by the "page number" model above (e.g. headers in dictionaries, where the first word on the page is used as a header).

5. A combination of a document attribute or document part attribute and a page number (as in this document).

Blocks printed in fonts that are much larger than the fonts in the rest of the text or in bold fonts are considered as possible candidates for headings of different levels. The hierarchy of headings is reconstructed based on their numbering and font sizes. The reconstructed hierarchy is then used to assign the correct styles to the text fragments in the recognized document and to build a table of contents.

In one embodiment, the system generates hypotheses about figure and table captions, which are usually formatted in a style of their own and are located below, above, or, less commonly, to the side of the figure or table.

In one embodiment, the system generates hypotheses about footnotes and endnotes. Endnotes are searched for based on their typical spatial location and superscript indexes at the beginning of blocks. Footnotes are always located at the bottom of a page, only footers may be located below them. Footnotes are commonly separated from the body text by a horizontal line. Spatially, footnotes may be located immediately below the column to which they refer, or in a separate section below the columns, or in an insert in the bottom left-hand corner below multi-column text.

In some cases, the text of a footnote may carry over to the next page. These cases can be handled as follows. Once the system has detected the footnotes, it searches for their continuations: on all the pages that follow the pages with the detected footnotes, the system looks for paragraphs at the bottom of the page that have the same formatting as the detected footnotes. This method may work if the formatting of the footnotes differs considerably from the formatting of the column.

In one embodiment, the system searches for a table of contents by comparing the detected objects against the table of contents model stored in the collection 120. In another embodiment, a table of contents may be detected based on the tab leader dots or, if there are no dots, based on the numbers at the ends of the lines and the tabulation that precedes the numbers.

According to the present invention, a style describes font types and paragraph formatting. This corresponds to the notion of style as used in extended editable formats, for example, in RTF. As a result of the block 104, each hypothesis for each block contains, besides information about the logical structure, information about the style.

In one embodiment, each block hypothesis is verified. This includes comparing each block hypothesis with block models of possible logical structures for each block. Thus, the collection 120 also includes models of block logical structures. Each block hypothesis is compared or evaluated on the basis of a degree of correspondence between the block hypothesis and each of the block models.

Thus, verifying each block hypothesis includes generating at least one block hypothesis for each block on the page based on the document hypothesis and selecting a best block hypothesis for each block. The best block hypothesis is selected on the basis of estimation of correspondence parameters of the block to the block model and the model of the whole document. The decision about confirmation the document model hypothesis on a page is made on the basis of estimation of correspondence parameters of the page (blocks on the page) to the selected model of the whole document. If such estimation is satisfied, it considered as confirmation (105) of the selected hypothesis of the whole document on this page, and the system can go to verifying the document hypothesis on the next page.

Otherwise, if the hypothesis of the whole document is not confirmed on the page, the system has to correct (supplement) current document hypothesis or select (110) other hypothesis from the logical structure models collection 120 for the whole document.

Selecting, at block 106, one or more best document models executed on the basis of confirmation one of more hypotheses. The document hypothesis that correlates best with the entire document is selected as the best model of the document. In one embodiment, the best model may be selected automatically by the OCR system. In another embodiment, the best model may be selected manually by the user from among several models. For a manual selection, options are shown on a user interface and a user may make a selection through the user interface.

At block 108, the document with the recognized logical structure is formed and saved in an extended format in a memory.

Figure 2:
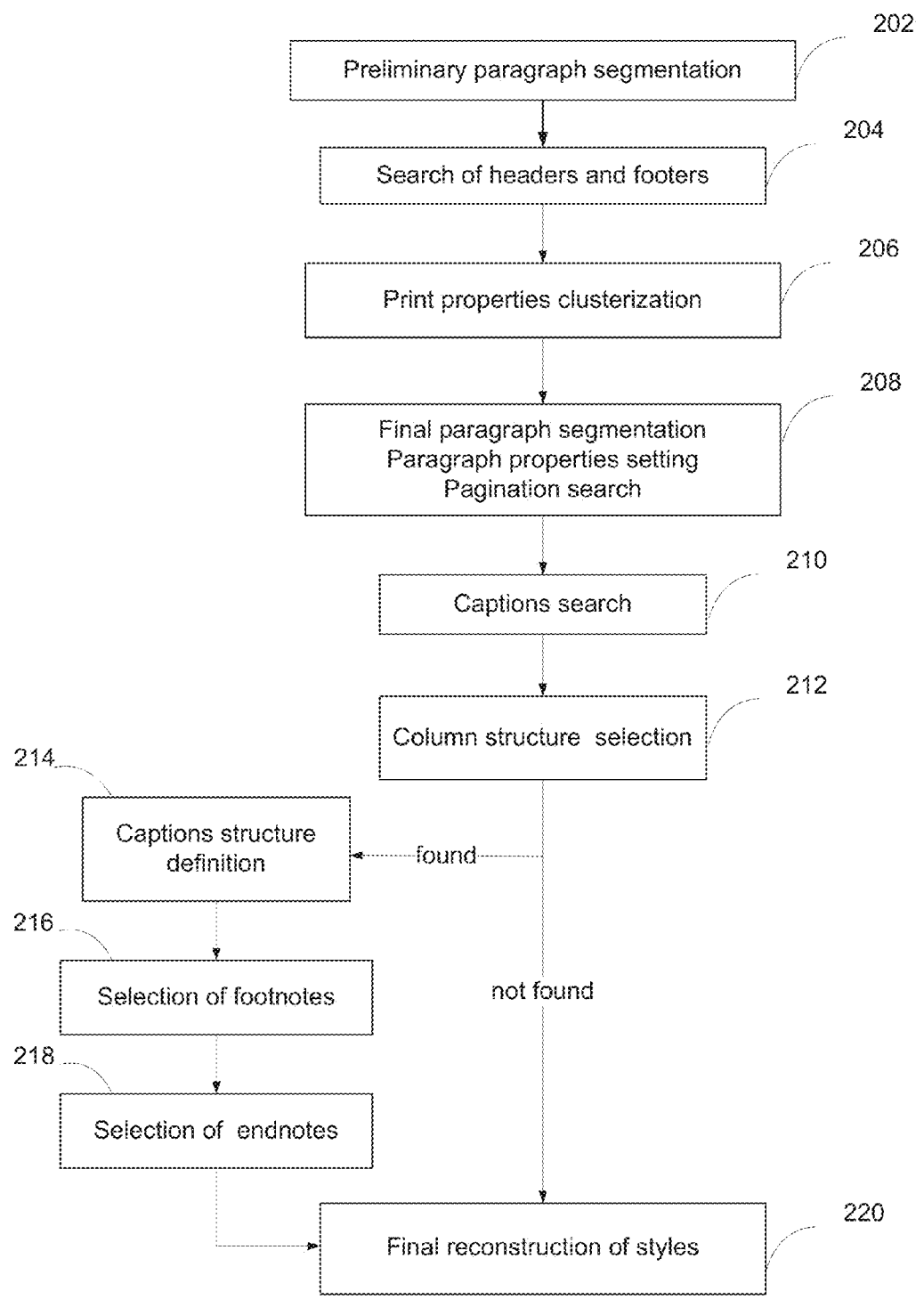
FIG. 2 shows a flowchart for recognizing the logical structure of a document, in accordance with one embodiment of the invention.

FIG. 2 of the drawings shows a flowchart of a possible sequence of actions for each generated hypothesis at the block 104 in accordance with one embodiment of the invention. Referring to FIG. 2, at block 202 the system performs a preliminary segmentation of the document into paragraphs. At block 204, the system looks for headers and footers. At block 206, the text is clustered based on the font properties. At block 208, the final division into paragraphs is performed and paragraph properties are assigned. Numberings are also searched for at this stage.

At block 210, captions are detected and processed—a captions search. At block 212, columns are detected. If columns are detected, at block 214 the system creates a heading structure, and at blocks 216 and 218, footnotes and endnotes may be detected.

At block 220, the final reconstruction of styles of entire document is provided.

Figure 3:
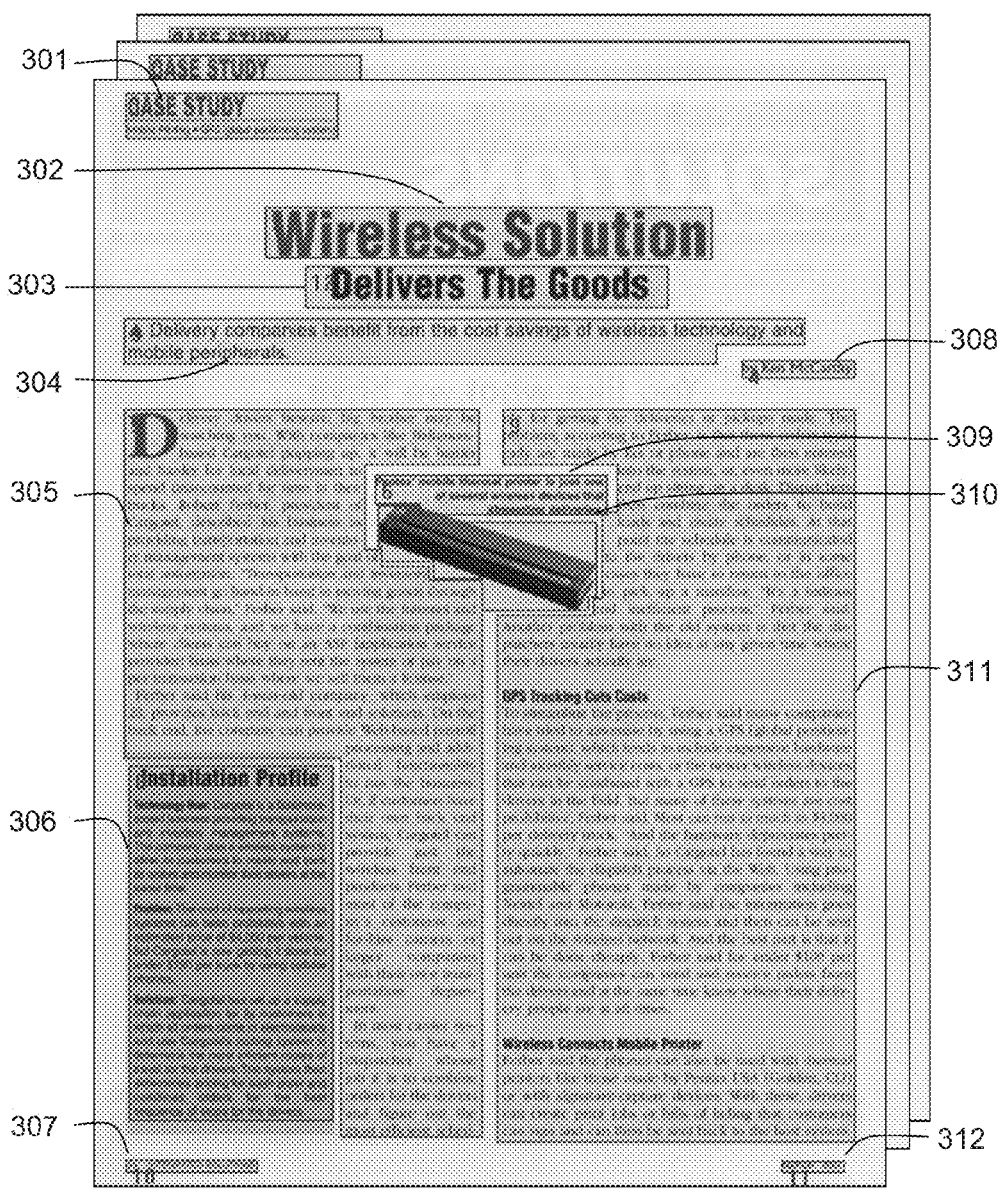
FIG. 3 shows an example of a document with selected elements of physical structure, in accordance with one embodiment of the invention.

FIG. 3 shows an example of a multipage document in which certain elements of physical structure, including a header 301, a title 302, a subtitle 302, inserts 304, 306, 308 and 309, a picture 310, footers 307 and 312 may be seen. These elements of physical structure have been selected for illustrative purposes only and are not intended to limit the scope of the invention in any way. In accordance with the techniques disclosed herein the system can detect that the text body contains two columns 305 and 311. Since the document may have page numbering, the system can recognize this too, and this hypothesis is verified on the others pages of the document.

Figure 3A:
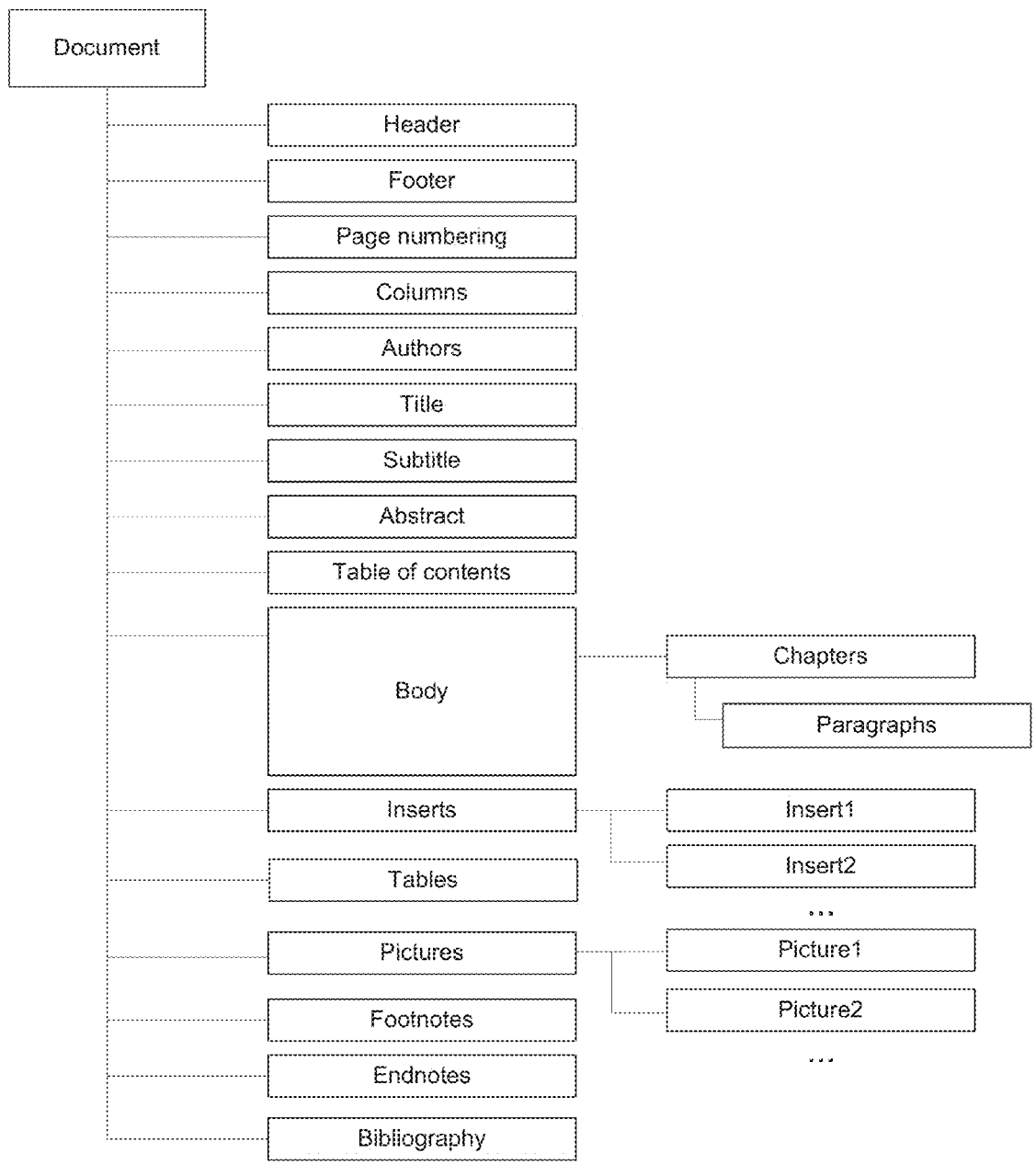
FIG. 3A shows an example of a document's logical structure description, in accordance with one embodiment of the invention.

FIG. 3A of the drawings shows an approximate example of a document's logical structure description. The logical structure is determined as a result of the OCR process disclosed herein. The elements of the logical structure description of FIG. 3A correspond to the form elements of the physical structure of FIG. 3, but with the meaning of and the relations between the form elements defined. The logical structure may be hierarchical, and the relations between the form elements may describe, for example, that the body includes chapters, subchapters, etc. with their numberings. Each chapter and subchapter may contain paragraphs, peculiar set of tables or/and pictures with their peculiar numberings and specific arrangement. Hereby some elements of the logical structure may have their parent elements.

Figure 4:
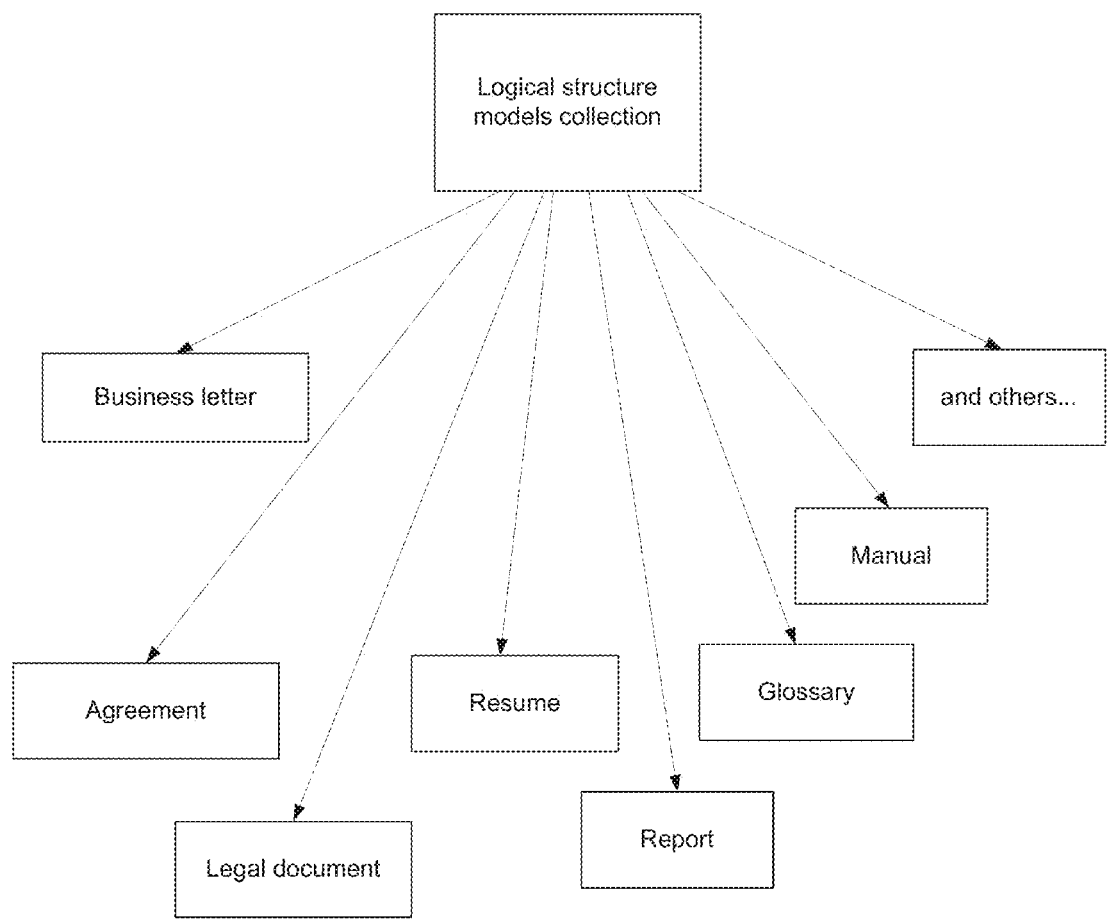
FIG. 4 shows an example description of a collection of document models, in accordance with one embodiment of the invention.

FIG. 4 shows an exemplary collection of document models with which the system of the present invention may be provisioned. The collection of models may include, for example, models for Agreements, Business letters, Legal documents, Resume, Reports, Glossaries, Manuals, and many others. The collection of models may be extended, modified, reduced and enriched, for example, by users, or automatically by the system in response to, for example, scanning a document that does not sufficiently correspond to one of the models in the collection.

Figure 5:
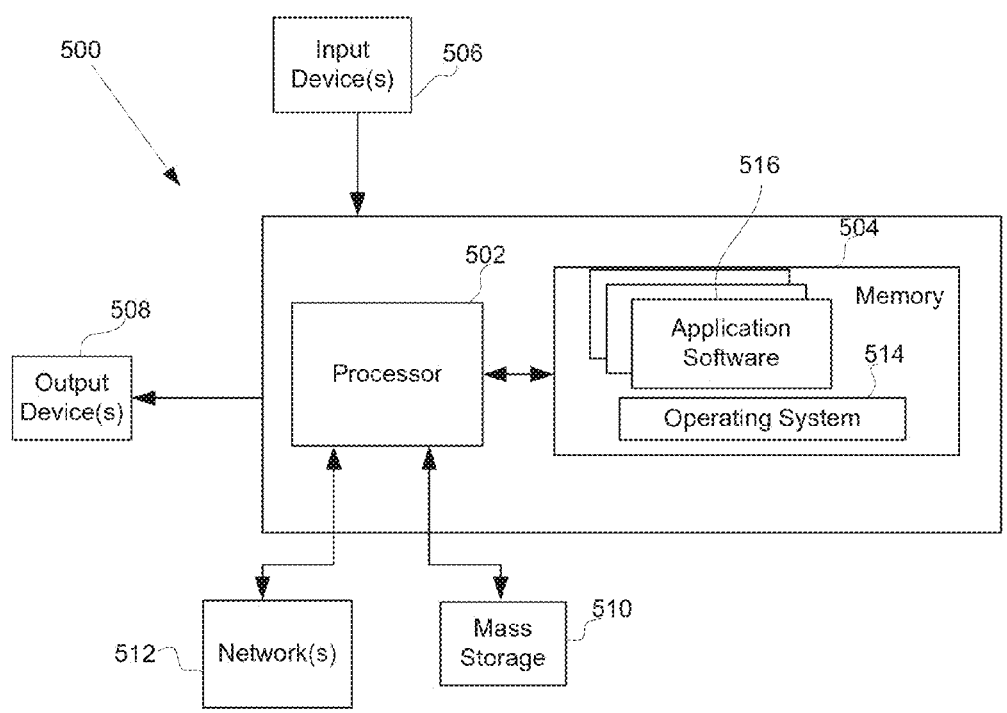
FIG. 5 shows a block diagram of hardware for an OCR system, in accordance with one embodiment of the invention.

FIG. 5 of the drawings shows an example of hardware 500 that may be used to implement the system, in accordance with one embodiment of the invention. The hardware 500 typically includes at least one processor 502 coupled to a memory 504. The processor 502 may represent one or more processors (e.g., microprocessors), and the memory 504 may represent random access memory (RAM) devices comprising a main storage of the hardware 500, as well as any supplemental levels of memory, e.g., cache memories, non-volatile or backup memories (e.g. programmable or flash memories), read-only memories, etc. In addition, the memory 504 may be considered to include memory storage physically located elsewhere in the hardware 500, e.g. any cache memory in the processor 502 as well as any storage capacity used as a virtual memory, e.g., as stored on a mass storage device 510.

The hardware 500 also typically receives a number of inputs and outputs for communicating information externally. For interface with a user or operator, the hardware 500 may include one or more user input devices 506 (e.g., a keyboard, a mouse, imaging device, scanner, etc.) and a one or more output devices 508 (e.g., a Liquid Crystal Display (LCD) panel, a sound playback device (speaker).

For additional storage, the hardware 500 may also include one or more mass storage devices 510, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 500 may include an interface with one or more networks 512 (e.g., a local area network (LAN), a wide area network (WAN), a wireless network, and/or the Internet among others) to permit the communication of information with other computers coupled to the networks. It should be appreciated that the hardware 500 typically includes suitable analog and/or digital interfaces between the processor 502 and each of the components 504, 506, 508, and 512 as is well known in the art.

The hardware 500 operates under the control of an operating system 514, and executes various computer software applications, components, programs, objects, modules, etc. to, implement the techniques described above. Moreover, various applications, components, programs, objects, etc., collectively indicated by reference 516 in FIG. 5, may also execute on one or more processors in another computer coupled to the hardware 500 via a network 512, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks, (DVDs), etc.), among others, and transmission type media such as digital and analog communication links.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

We claim:

1. A method for determining a logical structure of a document, the method comprising:
    acquiring at least one image of pages of the document;
    identifying one or more blocks in the image of the document;
    generating at least one document hypothesis for the whole document;
    for each document hypothesis, verifying said document hypothesis on each page;
    correcting or discarding said document hypothesis in case of disconfirming said document hypothesis on the respective page;
    selecting programmatically as a best document hypothesis the document hypothesis that has a best degree of correspondence with one or more block hypotheses for the document on pages of the document; and
    forming a representation of the document based on the best document hypothesis.

2. The method of claim 1, wherein the generating the at least one document hypothesis for the document is based on information about a possible arrangement of blocks of the document.

3. The method of claim 1, wherein the generating at least one document hypothesis for the document includes referencing a plurality of document models, wherein each document model describes one or more possible logical structures, and wherein each document model includes information about blocks of said respective document model.

4. The method of claim 1, wherein the generating the at least one document hypothesis for the document includes generating a plurality of hypotheses in order of differing probabilities.

5. The method of claim 1, wherein verifying said document hypothesis on each page includes:
    generating at least one page hypothesis including block hypothesis for each block on the page based on the document hypothesis; and
    selecting a page hypothesis based on best block hypothesis for each block.

6. The method of claim 1, wherein the method further comprises:
    saving the logical structure for the document in an extended format in a memory.

7. The method of claim 1, wherein the generating the at least one document hypothesis for the document is based on information about a possible arrangement of blocks of the document.

8. A method for determining a logical structure of a document, the method comprising:
    acquiring an image of the document;
    identifying one or more blocks in the image of the document;
    generating at least two document hypotheses for the image of the document, wherein said generating includes referencing a plurality of document models, wherein each document model describes one or more possible logical structures, and wherein each document model includes information about blocks of said respective document model;

after generating said at least two document hypotheses, generating at least one block hypothesis corresponding to at least one of said identified one or more blocks in the image of the document;

for each document hypothesis, selecting programmatically as a best document hypothesis the document hypothesis that has a best degree of correspondence with one or more block hypotheses for the document; and forming a representation of the document based on the best document hypothesis.

9. The method of claim 8, wherein each of said document models describes a set of essential and possible elements of document logical structure.

10. The method of claim 9, wherein each of said document models describes mutual arrangement of the elements within the document.

11. The method of claim 8, wherein generating the at least two document hypotheses includes generating hypotheses, each hypotheses having one or more differing probabilities in correspondence with one or more block hypotheses for the document.

12. The method of claim 8, wherein the identifying one or more blocks in the image of the document is carried out based on a physical structure analysis of the image of the document.

13. The method of claim 8, wherein the information about blocks of said respective model includes information about a possible arrangement of blocks in the respective model.

14. The method of claim 8, wherein identifying said one or more blocks in the image of the document includes selecting a best block hypothesis for each block by comparing each block hypothesis with information about blocks of said respective document model.

15. The method of claim 8, wherein said plurality of document models is one or more collections of models, and wherein each model of a collection of models includes information that is in common with other models of the collection of models.

16. The method of claim 8, wherein said representation of the document includes logical structures related to the document model corresponding to the best document hypothesis.

17. The method of claim 8, wherein said selecting as a best document hypothesis includes receiving an indication from a user through a signal received through a user interface element.

18. A non-transitory computer readable storage medium encoded with instructions for performing a computer-implemented method for determining a logical structure of a document, the computer-implemented method comprising:

acquiring an image of the document;

generating at least one document hypothesis for the image of the document, wherein said generating includes referencing a plurality of document models, wherein each document model describes one or more possible logical structures in the image of the document;

selecting programmatically as an acceptable document hypothesis the document hypothesis that has an acceptable correspondence with the image of the document; and forming a representation of the document based on the acceptable document hypothesis.

19. The non-transitory computer readable storage medium of claim 18, wherein one or more of the plurality of document models is stored in the computer readable storage medium.

20. The non-transitory computer readable storage medium of claim 18, wherein each document model includes information about blocks of said respective model, and wherein the instructions further comprise:

after said acquiring the image of the document:

identifying one or more blocks in the image of the document;

generating at least one block hypothesis corresponding to at least one of said identified one or more blocks in the image of the document; and for each document hypothesis, selecting an acceptable block hypothesis for each block.

21. The non-transitory computer readable storage medium of claim 20, wherein said selecting programmatically as an acceptable document hypothesis the document hypothesis includes selecting programmatically the document hypothesis that has an acceptable degree of correspondence with the selected acceptable block hypotheses for the document.

22. A system for determining a logical structure of a document, the system comprising:

a processor;

a memory configured with instructions to perform a method comprising:

acquiring an image of the document;

generating at least one document hypothesis for the image of the document, wherein said generating includes referencing a plurality of document models, wherein each document model describes one or more possible logical structures in the image of the document;

selecting programmatically as a best document hypothesis the document hypothesis that has a best correspondence with the image of the document; and forming a representation of the document based on the best document hypothesis.

23. The system of claim 22, wherein each document model includes information about blocks of said respective model, and wherein the instructions further comprise:

after said acquiring the image of the document:

identifying one or more blocks in the image of the document;

generating at least one block hypothesis corresponding to at least one of said identified one or more blocks in the image of the document; and for each document hypothesis, selecting a best block hypothesis for each block.

24. The system of claim 22, wherein said selecting programmatically as a best document hypothesis the document hypothesis includes selecting programmatically the document hypothesis that has the best degree of correspondence with the selected best block hypotheses for the document.

* * * * *